Dec. 15, 1959   R. H. ENGELMANN   2,917,663
SYNCHRONIZING AND COMPENSATING CIRCUIT
FOR HEADLIGHT CONTROL SYSTEM
Filed Feb. 18, 1958   2 Sheets-Sheet 1
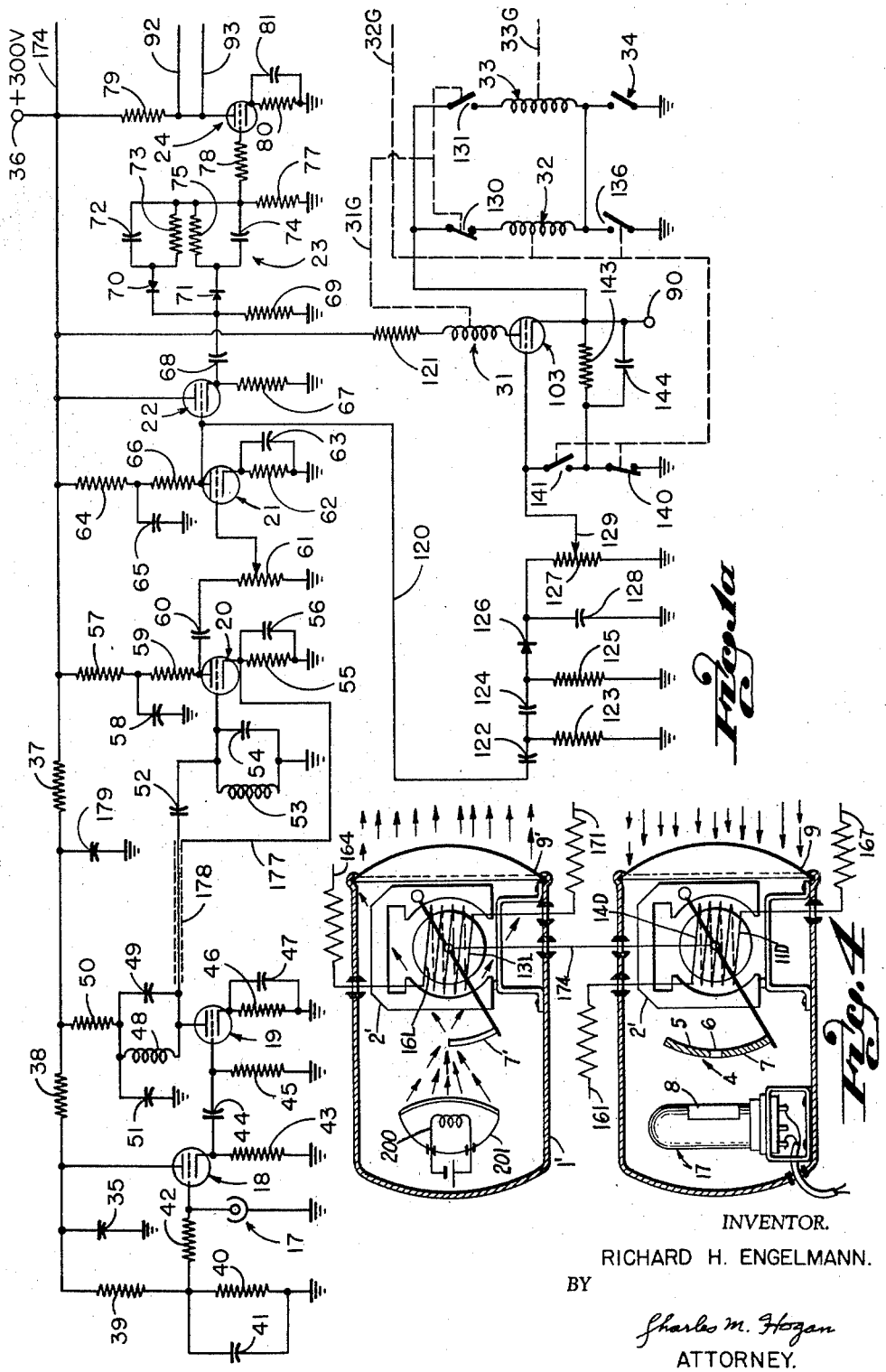
INVENTOR.
RICHARD H. ENGELMANN.
BY
*Charles M. Hogan*
ATTORNEY.

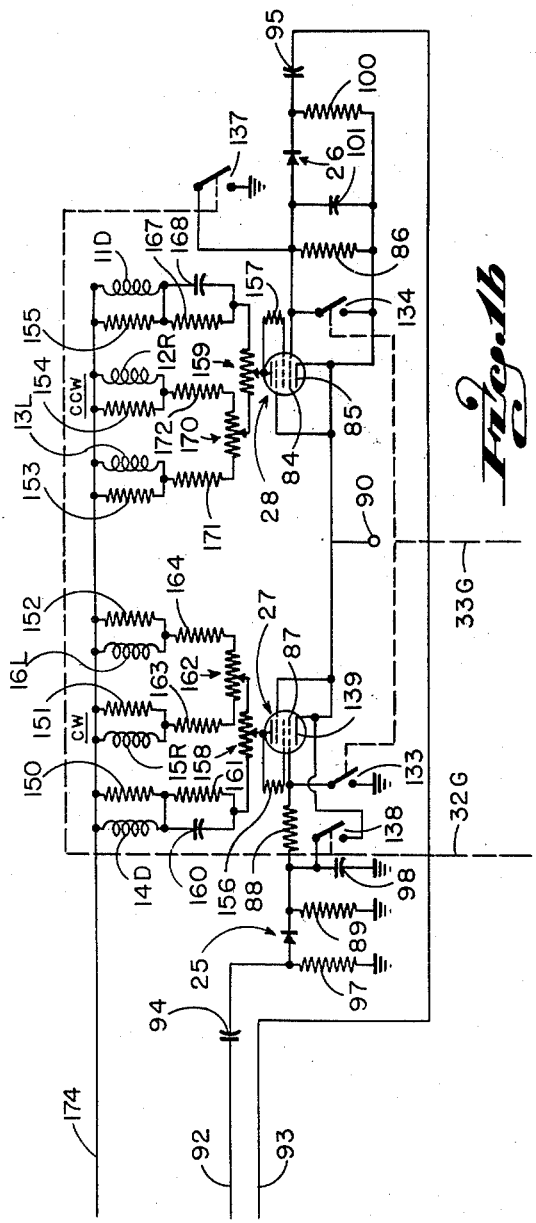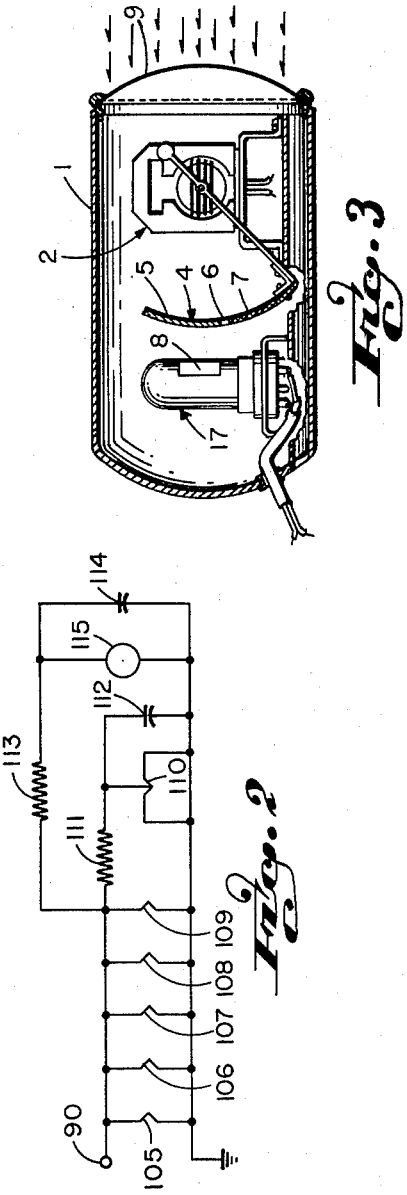

United States Patent Office 2,917,663
Patented Dec. 15, 1959

2,917,663

SYNCHRONIZING AND COMPENSATING CIRCUIT FOR HEADLIGHT CONTROL SYSTEM

Richard H. Engelmann, Cincinnati, Ohio, assignor, by mesne assignments, to J. Page Hayden, Cincinnati, Ohio Application February 18, 1958, Serial No. 715,973

17 Claims. (Cl. 315—82)

The present invention relates to headlight control systems generally and specifically to improvements in the basic Bone type of control system illustrated in United States Patents Nos. 2,562,258 and 2,753,487, issued to Evan P. Bone and assigned to J. Page Hayden, of Cincinnati, Ohio.

The Bone headlight control system is an electrical and optical installation in an automobile (i.e. equipped vehicle) which so functions that a non-glare shadow automatically is cast on the zone of an oncoming vehicle, as the passing approach is made, in order to protect its operator from disability and discomfort glare. The Bone system functions in such a way that light of such intensity as to effect greatly improved night visibility for the driver of the equipped vehicle continues to be projected onto the right side of the road in front of the equipped vehicle throughout the approach and until the approaching vehicles come alongside each other.

The system is premised generally on a direction finder including photoelectric means for detecting the presence of an oncoming vehicle, in combination with a vane which is positioned in azimuth, under the ultimate control of the photoelectric means, to measure the direction of approach of the oncoming vehicle (specifically, the relative bearing of the left or inner head lamp of the approaching vehicle, "inner" meaning closer to the center line of the highway). Synchronized with the direction finder vane are vanes in the headlamps which function in such a way as to define the projection of light and to cause the shadow or non-glare area to track the approaching vehicle until it passes or comes alongside the equipped car, all as described in detail in the aforementioned Bone patents, to which reference is made for a full description of the basic system relative to which the present invention constitutes an improvement. It will be understood that the full benefits of the basic system, i.e., safe night visibility and absence of disability and discomfort glare, are realized when both vehicles are equipped, but the system possesses the advantage of compatibility in that each equipped car operator has greater night visibility and the operator of every car approaching him is protected from glare.

Referring briefly to Fig. 3, before discussing the objects of the invention, there is shown a Bone-type direction finder comprising a casing 1, galvanometer movement 2, phototube 17, and arcuate shutter 4, positioned in azimuth by the galvanometer. The angular operating position of the shutter is indicative of the relative bearing of the oncoming vehicle. The shutter is formed with a graduated filter or semi-transparent area 5, a clear area 6, and an opaque area 7. The entire system is so arranged that when power is supplied and the equipped car moves down the road at night with no approaching vehicle in range, the filter 5 covers the phototube light-admitting aperture 8. The direction finder vane is then in the quiescent or retracted position (counterclockwise), and the headlamp vanes are so positioned (counterclockwise) that the full illumination of the headlamps is cast down the road. In this position of the direction finder vane the filter strongly attenuates light, coming toward the equipped car from regions to the right of the center line of the direction finder's field of view, and less strongly attenuates light from regions to the left of such center line. When an oncoming car enters into such field of view, and light from its inner headlamp reaches a predetermined value, the phototube signal output causes the vane to swing clockwise. The image of the oncoming car's headlamp is, as the vane swings clockwise, in progressively less dense portions of filter 5, causing increasing phototube output and increasing the swing on the vane until such a position is reached that clear area 6 registers with aperture 8. The attainment of this position by the vane permits full light from the oncoming headlamp to pass to the phototube. In other words, this is the "pickup position." As explained in the aforementioned Bone patents, the operation of the system is such that, once light from an oncoming approaching vehicle is picked up, the leading edge of opaque area 7 is automatically positioned in such a way as to track or measure the relative bearing of such vehicle and to control events which cause the headlamps of the equipped vehicle to properly angularly position the non-glare shadows they cast. The synchronism between the direction finder vane and the vanes in the headlamps is described in U.S. Patent 2,753,487 to Bone. Referring to Fig. 7 of that patent and Fig. 4 of the present patent application (reference numerals in Fig. 4) the angular position of direction finder vane portion 7 is synchronized with that of headlamp vane 7' (left headlamp shown) in such a way that headlamp vane 7' causes a non-glare shadow to be cast on an on-coming car. In Fig. 4 there are shown the direction finder and left headlamp, comprising a casing 1', vane 7', vane-positioning galvanometer 2', lens 9', light emitter filament 200 and reflector 201, all generally as described in Bone Patent 2,753,487. The galvanometer coils, 14D and 11D for the direction finder, and 13L and 16L for the headlamp, and associated connections, are also shown, the reference numerals being the same as in Figs. 1a, 1b, and 3.

The vanes 7 and 7' illustrated in Fig. 4 are mounted on vertical pivots so that they are angularly positionable in azimuth.

Because of this filter 5 on the direction finder vane, oncoming cars with down beams will approach much closer to the equipped car than will oncoming cars with up beams. The invention of the copending patent application of Richard H. Engelmann and Frank M. Foster, Serial No. 715,875, filed February 18, 1958, filed in the United States Patent Office simultaneously herewith, assigned to the same assignee as the present application and invention and entitled "Momentary Electrical Override for Headlight Control System" provides a means by which the driver of the equipped car can initiate a "search" operation and cause "pickup" to occur while an oncoming car with down beams is beyond the normal down-beam or dim light pickup range. "Pickup" is characterized by the presentation of clear area 6 to light-admitting slot 8 and by the casting of the protective non-glare shadow from the equipped car to the approaching car. The invention of such copending patent application also provides a means by which the driver of the equipped car can initiate a "flash" operation and remove the non-glare shadow from an approaching car when its operator neglects or fails to dim his lights in due season.

The principal object of the present invention is to provide a Bone-type direction finder and headlamp system characterized by a higher speed of response.

Another object of the invention is to provide, in a vehicle headlighting system of the type in which synchronized shadow-casting and bearing-indicating vanes are synchronously angularly positioned in accordance with the relative bearing of a light source, the improvement which comprises, in combination, a first means (left hand coils and associated network, Fig. 1b) including an active circuit element (tube 27) and utilizing the output of said element for driving said vanes in one angular direction (clockwise) and a second means (right hand coils and associated network, Fig. 1b) including an active circuit element (tube 28) and utilizing the output of said tube for driving said vanes in the opposite angular direction (counterclockwise), the prevailing output determining the direction in which the vanes turn.

It is an object of the invention to provide a vane driving circuit in which the clockwise-driving coils are arranged in parallel but each in series with the first of said tubes or active elements (27) and the counterclockwise driving coils are arranged in parallel but each in series with the second of said active elements (28), each group of coils being in circuit between tube anode and power supply.

A further object of the invention is to provide balancing potentiometers (158, 159) for controlling the distribution of current as between the direction finder vane-driving coil of each group and the associated pair of headlamp vane-driving coils. Also to provide balancing potentiometers (162, 170) for controlling the distribution of current within each pair of headlamp vane-driving coils. The adjustment of these potentiometers and the dropping resistors (numbered 161, 163, 164, 167, 171, 172) compensates for mismatch of the several galvanometers and mismatch of the geometry of the vanes, such mismatching arising from different galvanometer spring constants, different galvanometer resistances and flux densities, different numbers of turns on the galvanometer coils, different vane radii and different lens focal lengths.

It is also an object of the invention to improve the damping and stability of the vane action.

Among additional objects of the invention is the provision of an improved amplifier having high gain and desirable noise-rejection characteristics rendering it particularly suitable for a vehicle headlamp system.

For a better understanding of the present invention, together with other and further objects, advantages and capabilities thereof, reference is made to the following description of the accompanying drawings, in which:

Figs. 1a and 1b are circuit diagrams which in composite illustrate the complete circuitry of a headlighting system incorporating the improvements in accordance with a preferred embodiment of the invention;

Fig. 2 is a circuit diagram showing typical filament and chopper motor circuit arrangements suitable for use in the system;

Fig. 3 is a horizontal sectional view through a Bone-type direction finder showing a photoelectric tube, and galvanometer, together with the associated arcuate vane, the vane being illustrated in the angular position assumed when no oncoming vehicle is present; and Fig. 4 is a horizontal view through the direction finder and left headlamp, showing the galvanometer windings and associated connections.

The amplifier is composed of amplifier stages (tubes 20, 21, 22 and 24) feeding into rectifiers 25 and 26 and a D.C. difference amplifier (tubes 27 and 28). The principal function of the amplifier is to provide additional amplification of the signal from the preamplifier (including tubes 18, 19) and to convert it from A.C. to D.C. so as to control the current flow through the galvanometer coils.

A secondary function of the amplifier is to include suitable compensating networks for stabilization of the system. Three such suitable compensating networks are in the main loop. One of these is between the cathode follower (tube 22) and the grid of tube 24. This network is a non-linear anti-hunt circuit. Lead networks are used with the direction finder galvanometer coils 11D, 14D. These networks are composed of the combinations 160, 161 and 167, 168, together with the resistance of the shunted galvanometer coils. The third stabilization means is the resistors shunting the galvanometer coils to provide damping.

The galvanometers used have center-tapped coils (each center-tapped coil being treated herein as two coils for facility of exposition), and may be driven in either direction from their rest positions, which are at the centers of their travel. Current through one half of the windings (that controlled by tube 28) causes the vanes and hence the shadows to retract. Current through the other half (controlled by tube 27) causes the vanes to swing so as to cut off almost all illumination. When tracking, conduction shifts back and forth between tubes 27 and 28 so as to maintain the shadows just covering oncoming cars.

The resistor and potentiometer networks between the plates of tubes 27 and 28 and the galvanometers are used to make the headlamp vanes track correctly with respect to each other and the direction finder vane. In addition, the resistors have such values that they compensate for differences in the geometry of the headlamps and the direction finder. Advantage is taken of the presence of this network to introduce the lead networks mentioned above.

Referring now generally to Figs. 1a and 1b, attention is first invited to the coils in Fig. 1b for actuating the galvanometer movements to position the vanes of the headlamps and the direction finder. Three of these coils drive the direction finder and headlamp vanes synchronously in azimuth in such a direction as to increase the width of the light cast down the road by an equipped car and to diminish the width of the non-glare shadow. Specifically, there are provided direction finder galvanometer coil 11D, right headlamp galvanometer coil 12R and left headlamp galvanometer coil 13L. It should be borne in mind throughout this discussion that an increase in current through those coils (whether caused by normal automatic operation or by the manual "flash" override) causes the armatures and vanes of each of the galvanometers to turn in a counterclockwise direction, Fig. 3.

Similarly, there are provided, essentially in parallel combination, galvanometer coils 14D, 15R and 16L, for the direction finder and right and left headlamps, respectively. It should be remembered throughout this description that when the combination of coils 14D, 15R and 16L is energized by an increment of current (as in normal automatic operation or in response to the manual "search" override) the operation is such that the vanes and armatures of the headlights and direction finder synchronously rotate in a clockwise direction, as indicated by the legend "CW" placed adjacent these coils.

The arrangement of rectifier 126, tube 103, relays 31, 32 and 33, and associated relay contacts is described briefly and disclosed but not per se claimed herein in that it is claimed in the abovementioned copending patent application of Richard H. Engelmann and Frank M. Foster, entitled "Momentary Electrical Override for Headlight Control System," filed simultaneously herewith and assigned to the same assignee as the present application and invention. Reference is made to such copending application for a detailed discussion of such arrangement.

The circuitry illustrated in Figs. 1a and 1b automatically synchronizes and positions the synchronized vanes of a Bone-type system in improved fashion, in accordance with the present invention and also provides "search" and "flash" override controls in accordance with the invention disclosed and claimed in the aforementioned copending patent application of Engelmann and Foster.

Accordingly, the circuitry herein disclosed comprises the following cascaded stages: a phototube stage including phototube 17 (Fig. 1a); a cathode follower stage comprising a triode 18; a tuned amplifier stage comprising a triode 19; further amplifier stages including triodes 20 and 21; a cathode follower stage including triode 22; a transient response compensating network 23; a resistance-capacitance coupled amplifier stage including triode 24 (Fig. 1a); and an output network comprising opposite polarity diode networks 25 and 26 (Fig. 1b), to which are individually coupled power amplifier stages including pentodes 27 and 28, respectively. The over-all operation of the output networks is such that rectifier 25 produces positive voltages which render tube 27 more conductive and therefore proudce current flows in coils 14D, 15R and16L which turn the associated vanes in a clockwise direction, while the rectifier system 26 produces negative voltages wihch render tube 28 less conductive and therefore reduce current flows in coils 11D, 12R and 13L which tend to turn such vanes in a counterclockwise fashion. Therefore the action of the two rectifier systems is supplemental. This overall operation occurs on an increase in the output voltage from tube 24, as when an oncoming car approaches under normal operating conditions. That is, light from approaching headlamps drives the direction finder vanes clockwise (in such a direction as to cut off the light). Conversely, when the oncoming car has passed, so that radiant energy is not impinging on phototube 17, the signal from amplifier 24 decreases, whereby tube 27 becomes less conductive (the output from rectifier 25 being less posiitve) and tube 28 more conductive (the output from rectifier 26 being less negative) so that the vanes are actuated in a counterclockwise direction. Thus it will be seen that tube 27 and associated connections back to resistor 97 and capacitor 94 constitute a first controller which, on increase of input signal intensity at the phototube, drives the vanes clockwise. Tube 28 and associated connections back to resistor 100 and capacitor 95 constitute a second controller, which, on decrease of such intensity, drives the vanes counterclockwise.

There is shown a switching network illustrated generally in the lower part of Figs. 1a and 1b, which includes relays 31, 32 and 33, and a foot switch 34 (Fig. 1a), in combinaiton, together with associated electrical and mechanical components including contacts and ganging means 31G, 32G, and 33G (Figs. 1a and 1b). This combination controls the searching and flashing and selecting functions to which the copending patent application of Engelmann and Foster is directed.

Returning now to a discussion of the detailed circuitry, the main stages of the system having been pointed out, there is shown a phototube 17 to which radiant energy from point light sources, as for example, the inner head lamp of an oncoming vehicle, is applied. Such radiant energy is in the form of pulses of light, the phototube 17 of the present application preferably corresponding to phototube 13 shown in the co-pending patent application of Harold J. Behm and William Hecox, Serial No. 567,970, filed in the United States Patent Office on February 27, 1956, entitled "Direction Finder for Automobile Headlighting System," issued as U.S. Patent No. 2,878,396 on March 17, 1959, and assigned to the same assignee as the present invention and application.

Reference is made to such copending Behm and Hecox application for a detailed description of the preferred means and mode of energization of phototube 17. The invention of the present application is of course not limited to utility with the Behm-Hecox direction finder.

Operating voltage for the phototube is supplied from a high voltage terminal 36 (at plus 300 volts for example) and between such terminal and ground are serially arranged voltage divider resistors 37, 38, 39 and 40. A filter network is made up of resistor 40 and shunt capacitor 41 and their junction is connected through phototube load resistor 42 to the anode of photocell 17, the junction of such resistor 42 and anode being in turn connected to the grid of amplifier triode 18. Due to the fact that the light on the phototube 17 is in pulses, an alternating voltage appears at the grid of triode 18.

Triode 18 includes the usual cathode resistor 43 and connections to the high voltage source and is arranged as a cathode follower so as to provide a low impedance output and a high impedance input suitably matching the phototube circuit. Tube 18 is A.C. decoupled from the power supply by series resistor 38 and shunt capacitor 35.

The output of amplifier stage 18 is coupled as by capacitor 44 and grid resistor 45 to the grid of triode 19, the cathode circuit of which includes cathode resistor 46, by-passed by capacitor 47. The anode load of triode 19 comprises a tuned parallel combination of inductor 48 and capacitor 49. Such tuned combination is connected to the high voltage source through a filter including series resistor 50 and shunt capacitor 51.

The tuned anode circuit of amplifier stage 19 is coupled to amplifier stage 20 through a coupling capacitor 52. In order to provide a double tuned band pass network, with desirable noise rejection characteristics, and a flat double humped pass band of sufficient width (for example 100 cycles) to allow for variations in frequency of the light pulsations on the phototube, there is inserted in shunt with the grid of tube 20 a tuned parallel combination of inductance 53 and capacitance 54. Both tuned circuits 48—49 and 53—54 are tuned approximately to the phototube output signal frequency of 1600 cycles per second, and are overcoupled by capacitance 52. Tube 20 has the usual cathode resistor 55 and by-pass capacitor 56 and its cathode is connected by conductor 177 to shield 178 in order to minimize stray pick-up.

Tube 20 is A.C. decoupled from the high voltage terminal 36 by a network comprising series resistor 57, shunt capacitor 58, and dropping resistor 59.

Tube 20 is in turn coupled to amplifier stage 21 by coupling capacitor 60 and adjustable grid resistor 61. Tube 21 has the usual cathode resistor 62 and by-pass capacitor 63 and is likewise A.C. decoupled from the high voltage power supply by series resistor 64, shunt capacitor 65, and dropping resistor 66. Tube 21 is in turn directly coupled to triode 22 which has a cathode resistor 67 and a direct anode connection to terminal 36.

The output of stage 22 is coupled, via series coupling capacitor 68 and shunt resistor 69, to a time dependent, non-linear compensating network. Several such networks are known in the art. That here shown for purposes of illustration but not limitation is described in the literature and the circuit parameters are set forth below. It comprises a pair of oppositely-poled rectifier branch circuits including diodes 70 and 71, each in series with a parallel resistance-capacitance network, such networks being designated by the reference numerals 72—73 and 74—75. The output of such compensating network is coupled to the grid circuit of amplifier stage 24 by shunt resistance 77 and series resistance 78. Amplifier stage 24 includes plate supply resistor 79 and cathode resistor 80, by-passed by capacitor 81.

The over-all operation of the circuitry so far described in detail: i.e., phototube 17 and stages in cascade therewith, is that there is produced at the output circuit of tube 24 an alternating wave signal which is utilized to control the Fig. 1b circuitry to drive the vanes in such a direction that the direction finder vane tends to cut off the passage of light to the phototube. In normal tracking operation a balance is attained such that the position of the direction finder vane indicates the azimuth of the oncoming light.

The circuitry illustrated in Figs. 1a and 1b is so arranged that when the power supply is disconnected from the system (i.e. the entire system turned off) the galvanometer armatures and vanes are in a central or static position in which the vane aperture 6 (Fig. 3) registers centrally with slot 8 of the phototube housing. When the system is turned on and the power supply connected thereto, the circuitry automatically operates to place the vanes and armatures in the extreme counterclockwise position illustrated in Fig. 3. That is, tube 28 is arranged to be normally conductive so that such tube and its associated galvanometer coils may be thought of, by crude analogy, as performing the gross function of springs which tend to bias each of the vanes into the extreme counterclockwise position. A decrement of current through tube 28 is grossly analogous to relaxation of such springs. Current in tube 27 is analogous to springs which bias the vanes in a clockwise direction. An increment of current in tube 27 causes the same result as the decrement in tube 28, i.e., causes or permits the vanes and armatures to move clockwise. In order to assure the positioning of the vanes in the static position just mentioned, tube 28 is rendered normally conductive by the return of its grid 84 to its cathode 85, via the rectifier load resistor 86. On the other hand, tube 27 is rendered normally of lower conductivity by the return of its grid 87, via series resistor 88 and rectifier load resistor 89 to ground. The cathodes of both tubes 27 and 28 are placed in a position above ground by connection to a positive terminal 90 (at plus 12.0 volts, for example). It will be seen from the foregoing that as the output from amplifier stage 24 (Fig. 1a) causes greater positive voltages to be produced across resistor 89 and greater negative voltages to be produced across resistor 86, tube 27 will become more conductive and tube 28 less conductive so that the supplemental and cooperative effect of both sets of galvanometer coils is to drive the vanes clockwise. Conversely, as the output signal from amplifier stage 24 decreases in intensity the positive voltage across resistor 89 and the negative voltage across resistor 86 decrease so that then the cooperative and concurrent effect of both sets of coils is to drive the vanes in the counterclockwise direction.

The phototube 17 and elements in cascade therewith up to and including tube 24 constitute a single-channel photoelectric signaling means for actuating the circuitry which drives the vanes clockwise and the circuitry which drives the vanes counterclockwise. The invention comprises a first means or first controller including a first vacuum tube 27 and utilizing the output of that vacuum tube for driving the vanes in the clockwise direction. This first means comprises a vacuum tube 27 and its input circuit and the coils 14D, 15R and 16L associated with that tube. The invention provides a second means or second controller including another vacuum tube 28 and utilizing the output of that tube for driving the vanes counterclockwise. This second means comprises the vacuum tube 28 and its input circuit and the coils 13L, 12R and 11D. The expression "vacuum tube" with regard to these output tubes is used in a sense sufficiently broad to include a transistor as an equivalent. The expression "first rectifying means" as used in the claims designates the rectifier 25 and associated connections, and the expression "second rectifying means" as used in the claims similarly designates the rectifier 26 and associated connections. The power supply or source of energy common to tubes 27 and 28 is connected to line 174 at terminal 36.

The over-all operation of the system will be apparent in the light of the above description. When the headlights of an approaching car are in the direction finder's field of view, the image of this car's headlights are formed by the lens (Fig. 3). This image is appropriately focused. When the light from this image falls on the phototube, the amplifying system drives the finder vane clockwise toward the spot of light. As soon as the finder vane reaches the light spot, it cuts off light to the phototube. The amplifying system now drives the vane imperceptibly counterclockwise toward its original position, but before it has moved an appreciable distance, the phototube again receives light. This reverses the direction of the drive on the vane. The result is that this finder feedback vane very slightly oscillates at a fairly high rate about the position of the image of an approaching headlight. Thus, the direction finder vane position is an indication of the angular position or direction of the headlight of an approaching car. The headlamp shadowcasting vanes are synchronized with the direction finder vane.

Expressing the operation in less general language, the lens 9 (Fig. 3) produces an image of oncoming headlamps at the light chopper, which is a motor driven cylinder (not shown herein but shown in detail in the abovementioned copending Behm and Hecox patent application) around the phototube 17 and phototube housing. The cylinder has longitudinal slits. Headlamp images will have a size comparable to slit width until the oncoming car is quite close. This produces pulses of light, causing a pulsed output from the phototube 17. Larger illuminated areas are not so effectively chopped, and consequently produce little or no pulsating signal from the phototube. It is the chopper which discriminates headlamps from illuminated signs, reflective signs, and the like.

The output of the phototube is fed through a cathode follower (tube 18) to a tuned amplifier stage (tube 19). This tuned stage is used to produce a narrow band width response centered on the chopper frequency. The narrow band width reduces the electrical noise voltages fed to the later amplifying stages.

The output signal from the preamplifier is sent to the principal amplifier, where it is amplified (by tubes 20, 21, 22, 24), rectified (by 25 and 26), and used to provide direct current signals to the three vane actuators (direction finder, left and right headlamps), which are Sanborn model 51–500S galvanometers modified by removal of the lower suspension and the usual stops. On "pickup" or tracking the galvanometer in the direction finder (having coils 11D and 14D) moves an edge of opaque portion 7 of the vane 4 into the path of the light from oncoming headlamps. (This vane is located just forward of the chopper cylinder.) When light from the oncoming car is interrupted by the vane, the signal disappears and the galvanometer is caused to move the opaque part 7 of the vane out of the way of the light. Signal reappears and the galvanometer moves the vane so as to interrupt the light once more. This "hunting" action has a low amplitude, high frequency (40 to 50 cycles per second) motion. This motion does not appear in the headlamp vanes because those vanes have more inertia.

A means is provided to increase the sensitivity of the system when it first "picks up" on oncoming lamps. This is accomplished by providing filter 5 on the direction finder vane. This filter is in such a position that it entirely covers the phototube when the vanes are in the retracted or counterclockwise position. In this position, the filter produces an effective attenuation of 20 or 25 to one on the center line of the field of the direction finder and for lights to the right of center line, and progressively less for lights to the left of center line, until a clear area is reached next the opaque portion 7. When the intensity of illumination from an oncoming car reaches 0.0266 foot-candles, the vane begins to swing clockwise so as to bring the opaque portion 7 toward the headlamp image. The image, therefore, is in progressively less dense portions of the filter 5, causing increasing signal and progressively more rapid motion of the vane until the opaque portion 7 is reached and the tracking action described above begins. The phototube therefore has twenty to twenty-five times as much light reaching it under these conditions as it does just before the system "picked up." Thus immediate dimming of the opposing headlamps will cause the effective illumination reaching the phototube to be no less than the illumination seen previously through the filter 5 and the system will continue to track.

In order to perform the above described operation, two outputs are taken from amplifier stage 24 at 92 and 93

(Fig. 1b) and are individually coupled as by coupling capacitors 94 and 95 to the amplifier networks inclusive of diodes 25 and 26, respectively. Referring to rectifier 25, its anode is connected to ground via a resistor 97 and its cathode to ground via resistor 89 and the shunt filter capacitor 98, to the end that unidirectional voltages of positive polarity are applied to the grid of the tube 27 via series resistor 88.

Referring now to rectifier 26, its cathode is connected to cathode 85 via resistance 100 and its anode is connected to the same point via rectifier load resistance 86, shunted by filter capacitor 101, to the end that unidirectional voltages of negative polarity appear across rectifier load resistor 86 and are applied to the grid circuit of tube 28 to render it less conductive when increasing light is applied to phototube 17. The anode of rectifier 26 is connected directly to grid 84.

Parenthetically referring to Fig. 2 for the moment, the filaments of the tubes 103, 28, 27, 22 and 24 (one envelope) and 20—21 (one envelope) are arranged in parallel and numbered 105, 106, 107, 108 and 109 respectively. The filament 110 of tubes 18 and 19 (one envelope) is connected to a dropping resistor 111 and filter capacitor 112, and powered at reduced voltage, as shown. Similarly, the chopper motor 115 (designated as element 27 in Fig. 2 of the aforementioned Behm and Hecox patent application, Serial No. 567,970), is provided with a dropping resistor 113 and filter capacitor 114.

The lower portion of Fig. 1a and the associated Fig. 1b relay circuitry with which the copending Engelmann-Foster patent application is principally concerned, are described in detail in that application Serial No. 715,875 to which reference is made. In summary, closing of foot-switch 34 automatically initiates either a searching or a flashing operation, as road conditions require. The intensity of the signal present at conductor 120, connected to the output of tube 21, depends on the nature of such conditions and, upon closing of switch 34, sets into operation circuitry which causes the system to "flash" or to "search," depending on which function was automatically selected. Relay 31 is an amplitude-sensitive device which determines whether a searching or flashing function will be performed by the actuation of switch 34, searching being performed when the light signal input to phototube 17 is below the threshold (as when an approaching car with dim lights is beyond the dim light pickup range), flashing being performed when such light input is above the threshold value. The coil of relay 31 is in a series circuit comprising high voltage terminal 36, resistor 121, triode 103, and low voltage battery terminal 90 so that relay 31 is energized when tube 103 is conductive. Tube 103 becomes conductive when the signal applied to its grid exceeds the threshold value.

When relay 31 is energized, as by normal pickup of an oncoming car, it dictates that a flashing operation shall be initiated when foot-switch 34 is closed. Device 31, by controlling contacts 130 and 131, automatically disables the search relay 32 (by opening 130) and "sets up" flash relay 33, if the signal intensity on line 120 indicates that pickup has occurred.

Flash relay 33 controls, as by ganging means 33G, two sets of contacts 133, 134 (Fig. 1b), closing of the former of which connects grid 87 to ground, reducing conduction in tube 27, closing of the latter of which connects grid 84 directly to cathode 85 and increases the conduction of tube 28, with the result that the vanes are moved in a counterclockwise direction for "flash." Flash relay 33 is a bias switching device which controls contacts 133, 134 to bias counterclockwise-actuating tube 28 into more conductivity and clockwise-actuating tube 27 into less conductivity. At the conclusion of the "flash" operation the coil of 33 is deenergized and contacts 133 and 134 are opened.

When the light input to phototube 17 is below that which corresponds to threshold value of signal on line 120, tube 103 is non-conductive and relay 31 is de-energized, closing contacts 130 and opening contacts 131 (as shown in Fig. 1a). Since contacts 131 are open the flashing relay 33 cannot be energized by closure of switch 34 and therefore contacts 133 and 134 are also open (as shown in Fig. 1b). However, the closing of contact 130 "sets up" relay 32 and permits the momentary closing of switch 34 to energize search relay 32.

Search relay 32 is a bias-switching device which controls contacts 138 and 137 to bias tube 27 into more conductivity and tube 28 into less conductivity to move the vanes clockwise. It is also a holding device which controls contacts 136 to keep its own coil energized. It is, further, a delay device which controls contacts 140—141 to provide for a predetermined search period.

Referring now to the galvanometer coil circuits in Fig. 1b, each coil is provided with a parallel damping resistor as shown, the resistors being numbered 150, 151, 152, 153, 154 and 155.

The screen grids of tubes 27 and 28 are connected to the anodes by low resistors 156 and 157, respectively, so that the operation is essentially triode operation. The anode of tube 27 is connected to an adjustable contact on balancing resistor 158 and the anode of tube 28 is connected to an adjustable contact on balancing resistor 159. One terminal of resistor 158 is connected through a resistance-capacitance anti-hunting network 160, 161, to the direction finder coil 14D. The other terminal of balancing resistor 158 is connected to an adjustable contact on balancing resistor 162 and the leads of such resistor are connected, via resistors 163, 164, to galvanometer coils 15R and 16L, respectively.

The right hand coils are similarly arranged, one lead of balancing resistor 159 being connected to the direction finder coil 11D through a resistance-capacitance, anti-hunting network 167, 168, and the other lead of the balancing resistor being connected to an adjustable contact on balancing resistor 170, the leads of which are connected by resistors 171, 172 to the head lamp galvanometer coils 13L and 12R, respectively. As previously indicated, all six coils are connected to power supply terminal 36. The contacts 137 are connected between grid 84 and ground, and contacts 138 between the cathode of rectifier 25 and the cathode of tube 27. Contacts 133 are connected between grid 87 and ground and contacts 134 between grid 84 and cathode 85.

The positioning of the adjustable contact on balancing resistor 158 determines the relative distribution of current as between the direction finder clockwise-moving galvanometer coil on the one hand and the corresponding head lamp galvanometer coils on the other. Positioning of the adjustable contact on resistor 159 determines the distribution of current between the counterclockwise direction finder galvanometer coil on the one hand and the corresponding head lamp coils on the other. The position of the sliding contact on balancing resistor 162 determines the distribution of current as between the two clockwise head lamp galvanometer coils and, similarly, the position of the sliding contact on galvanometer 170 determines the distribution of current as between the two counterclockwise head lamp galvanometer coils.

The purpose of the resistors 150–155 in the output circuit is to provide an additional means of damping in the main loop of the system, which includes the direction finder galvanometer coils 11D and 14D, and to provide damping of the motion of the headlamp vanes through headlamp galvanometer coils 12R, 13L, 15R, and 16L.

The purpose of the resistors 161, 163, 164, 167, 171 and 172 is to provide the compensation means for differences in geometry of the headlamps and of the direction finder (vane radii and focal lengths).

The potentiometers 158, 159, 162, and 170 are adjusted to compensate for minor variations in damping resistors 150–155 and compensation resistors 161, 163, 164, 167, 171, and 172 and also to compensate for differences in geometry of the galvanometers, for different galvanometer resistances, and for different spring compliances, different flux densities in the galvanometers and different numbers of turns on the coils. In addition, adjustment of the potentiometers can be used to compensate for parallax at a given distance.

While I do not intend to be limited to the parameters now to be mentioned, the following parameters have been found to be satisfactory in one successful embodiment of the present invention and they are furnished by way of illustration.

Resistors:[1] Value
- 39 — 2.2 megohms.
- 40 — 1.0 megohm, ½ watt paralleled by 1.5 megohm, ½ watt.
- 42 — 20 megohms precision.
- 43 — 100,000 ohms.
- 45 — 2.2 megohms, ½ watt.
- 38 — 10,000 ohms, ½ watt.
- 50 — 10,000 ohms, 1 watt.
- 46 — 4,700 ohms, 1 watt.
- 37 — 470,000 ohms, ½ watt.
- 57 — 10,000 ohms, 2 watts.
- 59 — 330,000 ohms, 1 watt.
- 55 — 4,700 ohms, 1 watt.
- 61 — 1 megohm potentiometer.
- 64 — 100,000 ohms, 1 watt.
- 66 — 470,000 ohms, ½ watt.
- 62 — 10,000, ½ watt.
- 67 — 100,000, 1 watt.
- 69 — 10,000 ohms, 1 watt.
- 73 — 470,000 ohms, ½ watt.
- 75 — 470,000 ohms, ½ watt.
- 77 — 15,000 ohms, ½ watt.
- 78 — 100,000 ohms, ½ watt.
- 79 — 33,000 ohms, 1 watt.
- 80 — 4,700 ohms, 1 watt.
- 150, 151, 152, 153, 154, 155 — 1000 ohms precision.
- 161 — 7,500 ohms, 5 watts.
- 163, 164, 171, 172 — 6,300 ohms, 5 watts.
- 167 — 7,500, 5 watts.
- 158, 162, 170, 159 — 500 ohms, 1 watt, screw driver potentiometer.
- 156 — 150 ohms, ½ watt.
- 157 — 150 ohms, ½ watt.
- 97 — 100,000 ohms, ½ watt.
- 89 — 1.0 megohm, ½ watt.
- 88 — 100,000 ohms, ½ watt.
- 86 — 1.0 megohm, ½ watt.
- 100 — 100,000 ohms, ½ watt.
- 121 — 15,000 ohms, 2 watts.
- 123 — 470,000 ohms, ½ watt.
- 125 — 470,000 ohms, ½ watt.
- 127 — 2.0 megohms, potentiometer.
- 143 — 8,200, ½ watt.
- 111 — 25 ohms, 10 watt paralleled by 100 ohms, 1 watt.
- 113 — 220 ohms, 1 watt.

[1] Ohms unless otherwise stated.

Capacitors: Value
- 41 — 2 microfarads, 150 volts electrolytic.
- 35 — 20 microfarads, 400 volts electrolytic.
- 44 — 470 micromicrofarads.
- 49 — About 0.2 microfarad.
- 47 — 2.5 microfarads, 25 volts electrolytic.
- 51 — 20 microfarads, 400 volts electrolytic.
- 179 — 10 microfarads, 450 volts electrolytic.
- 52 — 6500 micromicrofarads.
- 54 — About 0.14 microfarad.
- 58 — 10 microfarads, 450 volts electrolytic.
- 56 — 2.5 microfarads, 25 volts electrolytic.
- 60 — 2000 micromicrofarads.
- 65 — 10 microfarads, 450 volts electrolytic.

Capacitors: Value
- 63 — 2.5 microfarads, 25 volts electrolytic.
- 68 — 0.1 microfarad, 400 volts.
- 72 — 0.05 microfarad, 400 volts.
- 74 — 0.05 microfarad, 400 volts.
- 81 — 50 microfarads, 25 volts electrolytic.
- 160 — 1.5 microfarads, 200 volts.
- 168 — 1.5 microfarads, 200 volts.
- 94 — 0.1 microfarad, 400 volts.
- 95 — 0.1 microfarad, 400 volts.
- 98 — 2200 micromicrofarads.
- 101 — 2200 micromicrofarads.
- 122 — 1000 micromicrofarads.
- 124 — 0.01 microfarad.
- 144 — 0.25 microfarad.
- 114 — 10 microfarads, 15 volts electrolytic.
- 112 — 500 microfarads, 12 volts electrolytic.
- 128 — 0.05 microfarad.

Inductances: Type
- 48 — UTC MQE5 (United Transformer Corporation).
- 53 — UTC MQE6.

Tubes:
- 17 — 918.
- 18, 19 — ECC 83 (12AX7).
- 20, 21 — ECC 83 (12AX7).
- 22 — 12AX7.
- 27 — 12BK5.
- 28 — 12BK5.
- 103 — 12AT7.

Diodes:
- 70, 71 — 1N55's or 1N67's.
- 25, 26 — 1N93's.
- 126 — 1N55.

Relays:
- 31 — Advance Relay Cat. #SV1C2200D.
- 32 — Guardian Series 220, 12 v. 4PDT.
- 33 — Guardian Series 200, 12 v. DPDT.

Switch 34 — Momentary contact foot-switch.

Galvanometers:
- 11D, 14D; 12R, 15R, 13L, 16L — Sanborn Model 51–500S galvanometer modified by removing lower suspension.

Motor 115 — Kinder Co., controlled 6 v. D.C.

Power supply — Cornel-Dubilier Moblpak Power Con Model 12DC3.

Voltage: Value
- At terminal 90 — Plus 12 volts.
- At terminal 36 — Plus 300 volts.

Where there has been shown and described what is at present considered to be the preferred embodiment of the invention, it will be understood by those skilled in the art that various changes and modifications may be made therein without departing from the true scope of the invention as defined in the appended claims.

Having fully disclosed my invention, I claim:

1. In a vehicle headlighting system of the type in which synchronized shadow-casting and bearing-indicating vanes are angularly positioned in accordance with the relative bearing of a light source, the improvement which comprises, in combination, a first means including a first amplifier vacuum tube and utilizing the output of said tube for driving at least one of said vanes in one angular direction, a second means including another amplifier vacuum tube and utilizing the output of said tube for driving said vane in the opposite angular direction, the prevailing output determining the direction in which the vane turns, and a single-channel photoelectric signaling means for actuating both said first and second means.

2. In a vehicle headlighting system of the type in which synchronized shadow-casting vanes are synchronously angularly positioned in accordance with the relative bearing of a light source, the improvement which comprises, in combination, a first amplifying vacuum tube element controlling current for driving at least one of said vanes in one angular direction, a second amplifying vacuum tube element controlling current for driving said vane in the opposite angular direction, a power supply common to both tubes driving windings between each of such tubes and said power source, and a single-channel photoelectric signaling means for actuating both of said vacuum tubes.

3. A vane-positioning circuit for a vehicle headlamp system comprising: a first controller, a second controller, a source of energy in series with said controllers, a pair of clockwise headlamp vane-driving coils in series between said source and the first controller, a pair of counterclockwise headlamp vane-driving coils in series between sadi source and the second controller, and a common photoelectric signaling means for actuating both of said controllers.

4. A vane-positioning circuit in accordance with claim 3, a first distribution potentiometer having end terminals connected in circuit with the clockwise vane-driving coils and an adjustable tap in series with said first controller, and a second distribution potentiometer having end terminals connected in circuit with the counterclockwise vane-driving coils and an adjustable tap in series with said second controller.

5. A vane-positioning circuit in accordance with claim 4, and further including a clockwise direction-finder vane-driving coil in series between said source and the first controller and a counterclockwise direction-finder vane-driving coil in series between said source and the second controller.

6. In a vehicle-positioning circuit a first group of three coils for driving a pair of headlamp vanes and a direction-finder vane clockwise, a second group of three coils for driving said vanes counterclockwise, adjustable means for distributing current between the headlamp vane-driving coils of the first group, and adjustable means for distributing currents between the headlamp vane-driving coils of the second group.

7. The improvement in accordance with claim 6, adjustable means for distributing current between the direction-finder vane-driving coil and the pair of headlamp vane-driving coils of the first group, and adjustable means for distributing current between the direction-finder vane-driving coil and the pair of headlamp vane-driving coils of the second group, all of said coils being connected to a common power line.

8. The improvement in accordance with claim 7, and individual damping resistors in shunt with each coil.

9. The combination in accordance with claim 8, and resistive-capacitance anti-hunt networks in series with the direction-finder vane-driving coils.

10. In a vehicle headlamp system of the type including shadow-casting means, first driving means including an active circuit element for driving the vanes in one direction, second driving means including an active circuit element for driving the vanes in the opposite direction, bias means rendering the latter driving means prevalent in the absence of input signal, a rectifier for actuating the first driving means, a rectifier of opposite polarity for deactuating the second driving means, and single-channel input signaling means coupled to both of said rectifiers for rendering the first driving means prevalent when the input signal attains a predetermined value.

11. The improvement in accordance with claim 10 in which the single-channel input signaling means comprises, in cascade: a photosensitive pulse generator, a tuned amplifier, and means for further amplifying the output of said tuned amplifier.

12. A vane-positioning circuit for a vehicle headlight system comprising a source of energy, a first controller, a second controller, a pair of clockwise headlamp-vane-driving coils and a clockwise direction-finder-vane-driving coil in series between said source and the first controller, a pair of counterclockwise headlamp-vane-driving coils and a counterclockwise direction-finder-vane-driving coil in series between said source and the second controller, a first potentiometer having end terminals connected in circuit with the clockwise headlamp vane-driving coils and an adjustable tap, a second potentiometer having end terminals connected in circuit with the counterclockwise headlamp vane-driving coils and an adjustable tap, a third potentiometer having end terminals connected in circuit between said clockwise direction-finder vane-driving coil and the adjustable tap on the first potentiometer and also having an adjustable tap connected to the first controller, and a fourth potentiometer having end terminals connected between said counterclockwise direction-finder vane-driving coil and the adjustable tap on the second potentiometer and also having an adjustable tap connected to the second controller.

13. In a vehicle headlighting system of the type in which a shadow-casting vane is angularly positioned in accordance with the relative bearing of a light source, an improvement which comprises, in combination, a first electronic amplifier tube means for controlling the drive of said vane in one angular direction, a second electronic amplifier tube means for controlling the drive of said vane in the opposite angular direction, said tube means having input circuits, the prevailing output determining the direction in which the vane turns, and a single-channel photosensitive signaling means for actuating both of said electronic means, said signaling means comprising a photosensitive device and oppositely poled rectifiers coupled to said device, and means for severally coupling said rectifiers to said input circuits.

14. In a vehicle headlighting system of the type in which head lamp vanes are angularly positioned in accordance with the relative bearing of a light source, the improvement which comprises: individual electrical means for positioning the several vanes in synchronism, parallel circuits for energizing the positioning means, and manually operated means for adjusting the distribution of currents in said parallel circuits to compensate for non-uniformity in said vanes and electrical means.

15. In a vehicle headlighting system of the type in which synchronized shadow-casting and bearing-indicating vanes are angularly positioned in accordance with the relative bearing of a light source, the improvement which comprises, in combination: a first means including a first vacuum tube having anode, cathode and control electrodes and using the output of said tube for driving at least one of said vanes in one angular direction, a second means including another vacuum tube having anode, cathode and control electrodes and utilizing the output of said second tube for driving said vane in the opposite angular direction, the prevailing output determining the direction in which the vane turns, a first rectifying means for supplying positive output voltage to the control electrode of the first vacuum tube to drive the vane clockwise on increase of such positive voltage, an oppositely poled and second rectifying means for supplying a negative voltage to the second tube to drive the vane clockwise on increase of such negative voltage, a single-channel photoelectric signaling means for actuating both said first and second means, and means for coupling the signaling means to the rectifying means, said vane being driven clockwise on input signal increase and counterclockwise on input signal decrease.

16. In a vehicle headlighting system of the type in which synchronized shadow casting vanes are synchronously angularly positioned in accordance with the relative bearing of a light source, the improvement which comprises, in combination, a first vacuum tube having anode, cathode and control electrodes for controlling current to drive at least one of said vanes in one angular direction, a second vacuum tube having anode, cathode and control electrodes for controlling current to drive said vane in the opposite angular direction, a power supply common to both of said tubes, driving windings connected in series between the anodes of said tubes and said power source, and a single photoelectric signaling means for actuating both of said vacuum tubes.

17. In a vehicle headlighting system of the type in which synchronized shadow casting and bearing indicating vanes are angularly positioned in accordance with the relative bearing of a light source constituted by the headlamp of an opposing vehicle, the improvement which comprises, in combination: reversible electromagnetic means for actuating at least one of the vanes, a first vacuum tube coupled to said electromagnetic means and having a control electrode, the current through that tube being applied to said electromagnetic means to drive said vane in one angular direction, a second vacuum tube coupled to said electromagnetic means and having a control electrode, the current through the second tube being applied to said electromagnetic means to drive the vane in the opposite angular direction, two rectifying means of opposite polarity and individually coupled to said control electrodes for supplying voltages to said control electrodes, a single channel photoelectric signaling means, and means for coupling the signaling means to the rectifying means.

References Cited in the file of this patent

UNITED STATES PATENTS

| | | |
|---|---|---|
| 1,453,501 | Hash | May 1, 1923 |
| 1,506,238 | Hoefler | Aug. 26, 1924 |
| 2,082,042 | Wolff | June 1, 1937 |
| 2,494,607 | Bouchet | Jan. 17, 1950 |
| 2,753,487 | Bone | July 3, 1956 |